US010073770B2

(12) United States Patent
Frazier et al.

(10) Patent No.: US 10,073,770 B2
(45) Date of Patent: *Sep. 11, 2018

(54) SCHEME FOR DETERMINING DATA OBJECT USAGE IN A MEMORY REGION

(71) Applicant: International Business Machines Corporation, Armonk, NY (US)

(72) Inventors: Giles R. Frazier, Austin, TX (US); Michael Karl Gschwind, Chappaqua, NY (US); Younes Manton, Toronto (CA); Karl M. Taylor, Kanata (CA); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,270

(22) Filed: Aug. 24, 2015

(65) Prior Publication Data

US 2017/0031814 A1 Feb. 2, 2017

Related U.S. Application Data

(63) Continuation of application No. 14/809,778, filed on Jul. 27, 2015.

(51) Int. Cl.
*G06F 12/02* (2006.01)
*G06F 3/06* (2006.01)
*G06F 9/455* (2018.01)

(52) U.S. Cl.
CPC ........ *G06F 12/0253* (2013.01); *G06F 3/0608* (2013.01); *G06F 3/0652* (2013.01);
(Continued)

(58) Field of Classification Search
CPC .......... G06F 12/0253; G06F 2212/702; G06F 3/0608; G06F 3/0652; G06F 3/0653; G06F 3/0673; G06F 9/45504; G06F 2212/1044
(Continued)

(56) References Cited

U.S. PATENT DOCUMENTS 6,085,289 A 7/2000 Thatcher et al.
7,177,876 B2 2/2007 Sankaran
(Continued)

OTHER PUBLICATIONS

Warubrton, R., "Garbage Collection in Java (4)—Garbage First", published Jun. 24, 2013, retrieved from http://insightfullogic.com.*
(Continued)

*Primary Examiner* — Reginald Glenwood Bragdon
*Assistant Examiner* — Aaron D Ho
(74) *Attorney, Agent, or Firm* — Patterson & Sheridan, LLP

(57) ABSTRACT

Method and apparatus for managing memory is disclosed herein. In one embodiment, the method includes specifying a first load-monitored region within a memory, configuring a performance monitor to count object pointer accessed events associated with the first load-monitored region, executing a CPU instruction to load a pointer that points to a first location in the memory, responsive to determining that the first location is within the first load-monitored region, triggering an object pointer accessed event, updating a count of object pointer accessed events in the performance monitor, and performing garbage collection on the first load-monitored region based on the count of object pointer accessed events.

20 Claims, 5 Drawing Sheets

(52) U.S. Cl.
CPC .......... *G06F 3/0653* (2013.01); *G06F 3/0673* (2013.01); *G06F 9/45504* (2013.01); *G06F 2212/1044* (2013.01); *G06F 2212/702* (2013.01)

(58) Field of Classification Search
USPC .................. 711/106, 166; 707/813–820
See application file for complete search history.

(56) References Cited

U.S. PATENT DOCUMENTS

| | | | |
|---|---|---|---|
| 7,716,192 B2 | 5/2010 | Petrank et al. | |
| 7,769,974 B2 | 8/2010 | Bhansali et al. | |
| 7,849,293 B2 | 12/2010 | Blaner et al. | |
| 8,135,915 B2 | 3/2012 | Dimpsey et al. | |
| 8,396,999 B2 | 3/2013 | Vo et al. | |
| 8,527,559 B2 | 9/2013 | Ylonen | |
| 8,612,856 B2 | 12/2013 | Hotelling et al. | |
| 8,612,956 B2* | 12/2013 | Maier | G06F 12/0253 717/158 |
| 8,616,999 B2 | 12/2013 | Greaney et al. | |
| 8,782,104 B2* | 7/2014 | Bacon | G06F 12/0261 707/814 |
| 9,747,203 B2 | 8/2017 | Frazier et al. | |
| 2004/0139272 A1 | 7/2004 | Rodriguez-Rivera et al. | |
| 2007/0016633 A1* | 1/2007 | Lindholm | G06F 12/0269 |
| 2007/0162526 A1* | 7/2007 | Printezis | G06F 9/4843 |
| 2009/0327374 A1 | 12/2009 | Wright et al. | |
| 2011/0208792 A1* | 8/2011 | Printezis | G06F 12/0276 707/819 |
| 2011/0238922 A1* | 9/2011 | Hooker | G06F 12/0862 711/137 |
| 2012/0144144 A1 | 6/2012 | Worthington et al. | |
| 2013/0138703 A1* | 5/2013 | Daynes | G06F 9/44521 707/813 |
| 2014/0075163 A1 | 3/2014 | Loewenstein et al. | |
| 2016/0117114 A1* | 4/2016 | Heller, Jr. | G06F 3/0608 711/166 |
| 2017/0004074 A1 | 1/2017 | Frazier et al. | |
| 2017/0031812 A1 | 2/2017 | Frazier et al. | |
| 2017/0031813 A1 | 2/2017 | Frazier et al. | |
| 2017/0031814 A1 | 2/2017 | Frazier et al. | |
| 2017/0031817 A1 | 2/2017 | Frazier et al. | |

OTHER PUBLICATIONS

Detlefs, D., Flood, C., Heller, S., Printezis, T., "Garbage-First Garbage Collection", ISMM '04 Proceedings of the 4th international symposium on Memory management, pp. 37-48, 2004.*
Beckwith, M., "G1: One Garbage Collector to Rule Them All", published Jul. 15, 2013, retrieved from http://infoq.com.*
ARM, "ARM Synchronization Primitives", Aug. 18, 2009, Published by ARM.*
Bordet, S., "G1 Garbage Collector Details and Tuning", May 2015, geecon, Krakow, Poland.*
Oaks, S., "Java Performance: The Definitive Guide", Apr. 2014, O'Reilly Media, preview provided by Google Books, p. 150-155.*
U.S. Patent Application entitled Scheme for Determining Data Object Usage in a Memory Region, filed Jul. 27, 2015.
McDaniel, "An Analysis of a Mesa Instruction Set", Xerox Palo Alto Research Center, Jun. 1982, pp. 1-16. [Abstract Only].
Weiss, "Garbage Collectors—Serial vs. Parallel vs. CMS vs. G1 (and what's new in Java 8)", Takipi Inc., Sep. 3, 2014, pp. 1-10 (accessed from http://blog.takipi.com/garbage-collectors-serial-vs-parallel-vs-cms-vs-th-e-g1-and-whats-new-in-java-8/).
Siebert, "Concurrent, Parallel, Real-Time Garbage-Collection", ISMM'10, Jun. 5-6, 2010, ACM, 2010, pp. 1-10.
IBM, List of IBM Patents or Patent Applications Treated as Related, dated Apr. 24, 2018, 2 pages.

* cited by examiner

SCHEME FOR DETERMINING DATA OBJECT USAGE IN A MEMORY REGION

CROSS-REFERENCE TO RELATED APPLICATIONS

This application is a continuation of co-pending U.S. patent application Ser. No. 14/809,778, filed Jul. 27, 2015. The aforementioned related patent application is herein incorporated by reference in its entirety.

BACKGROUND

The present disclosure relates to a method for managing memory, and more specifically, a method for prioritizing regions of memory to optimize garbage collection performance.

It is often beneficial to determine whether there are any objects within a given memory region that are being accessed, and, if so, to obtain an estimate of their frequency of access. For example, performance may be improved if frequently-accessed objects in a memory region are consolidated or moved to a higher-speed memory region. Additionally, when defragmenting a large region of memory containing objects of various sizes with unused spaces between objects, it is often beneficial to determine if there are any objects within a given memory region that are being accessed and, if so, to obtain an estimate of their access rate. This information enables the defragmentation routine to prioritize defragmentation of memory regions that contain objects that are being used most frequently before those used less frequently.

Java virtual machines (JVM) and other runtime environments are a type of memory-managed applications that may occasionally perform a garbage collection operation on the area of memory used by the application. During a garbage collection operation, all other operations of the JVM typically cease, which significantly increases the response time of any transactions. This delay may cause problems for client devices accessing Java virtual machine.

SUMMARY

According to one embodiment, a method for managing memory is disclosed herein. The method includes specifying a first load-monitored region within a memory, configuring a performance monitor to count object pointer accessed events associated with the first load-monitored region, executing a CPU instruction to load a pointer that points to a first location in the memory, responsive to determining that the first location is within the first load-monitored region, triggering an object pointer accessed event, updating a count of object pointer accessed events in the performance monitor, and performing garbage collection on the first load-monitored region based on the count of object pointer accessed events.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Figure 1:
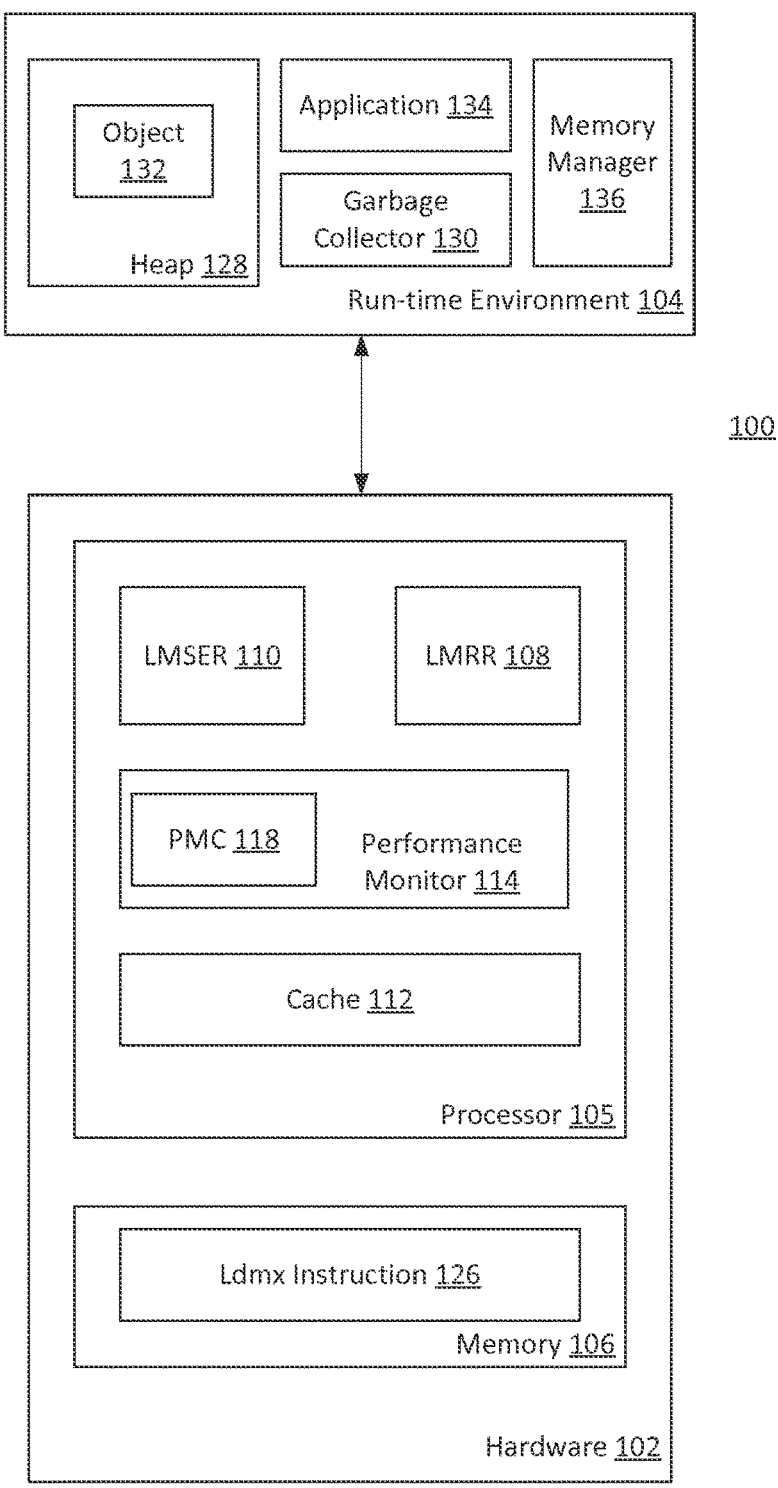
FIG. 1 illustrates a computing environment, according to one embodiment disclosed herein.

FIG. 1 illustrates a computing environment 100 according to one embodiment. The computing environment 100 includes hardware 102 and a run-time environment 104 launched by hardware 102. The hardware 102 includes a processor 105 and a memory 106. The processor 105 includes a load-monitored region register load-monitored region register (LMRR) 108, a load-monitored section enable register (LMSER) 110, and a cache 112. The processor 105 retrieves and executes programming instructions stored in memory 106 as well as stores and retrieves application data residing in the cache 112. The processor 105 is included to be representative of a single processor, multiple processors, a single processor having multiple processing cores, and the like. The processor 105 includes a performance monitor 114. The performance monitor 114 includes a performance monitor counter (PMC) 118. The performance monitor counter 118 is configured to count to occurrence of various events. The various events may include cache misses, instruction executions, branch mispredictions, and the like.

The memory 106 includes program code instructions for application(s) and/or run-time environment 104. Some of these program code instructions may be a load doubleword monitored (ldmx) instruction 126. The ldmx instruction 126 behaves similarly to a load doubleword instruction in that the ldmx instruction 126 loads the doubleword referenced by the instruction into a register. However, in the case of the ldmx instruction 126, the processor 105 also checks if the data loaded by the ldmx instruction 126 is a memory address that is in a block of user address space that is currently in the process of garbage collection.

The load-monitored region register 108 is a user-accessible register that indicates a block of user address space that is monitored as a target region for load instructions (referred to herein as a "load-monitored region" (LMR)). In some embodiments, the load-monitored region may be a block of user address space that is currently in the process of garbage collection. An object pointer accessed event is defined to occur whenever the ldmx instruction 126 loads a pointer that points into the load-monitored region specified by the load-monitored region register 108. In one implementation, the load-monitored region register 108 may include a 40-bit base effective address field identifying the starting address of the memory block being monitored (i.e., on which garbage collection is being performed), and a size field indicating the size of the memory block (e.g., 32 MB, 64 MB, 128 MB, etc.)

The load-monitored section enable register 110 is a user-accessible register that allows individual sections within the load-monitored region to be enabled or disabled. The section in the load-monitored region that is currently in the process of garbage collection is the load-monitored section. In one implementation, the load-monitored section enable register 110 may be a multi-bit field, where each bit of the register specifies whether a corresponding section within the range indicated by the load-monitored region register 108 is to be identified for garbage collection. Each section may be defined to be 1/Nth of the size of the load-monitored region. For example, each bit of a 64-bit load-monitored section enable register 110 may specify a section having $\frac{1}{64}^{th}$ of the size of the load-monitored range.

The run-time environment 104 supports execution of one or more applications (e.g. application 134) that provide, for example, web services, database services, and other information technology services that may involve retrieval, processing, and serving of data to one or more users. In one particular embodiment, the run-time environment 104 is a Java Runtime Environment, although it should be noted that other memory-managed environments may be utilized with embodiments of the present disclosure. Memory used by and during execution of application 134 is handled by memory manager 136. Memory manager 136 may allocate memory from a portion of guest physical memory specifically reserved for run-time environment 104, referred to as heap memory. The run-time environment 104 includes a heap 128 and a garbage collector 130, to manage one or more objects 132 allocated for the application 134 executing within the run-time environment 104. Garbage collector 130 is a memory manager for run-time environment 104 that attempts to reclaim heap memory occupied by objects in heap 128 that are no longer used by the run-time environment 104. Heap 128 includes a region of memory (referred to herein as "heap memory") reserved for storing one or more data objects (e.g. Java objects) and other data structures utilized during execution of the application 134. When the heap 128 runs out of space or fails to meet a threshold level of memory availability, the garbage collector 130 may initiate a garbage collection process wherein "live" objects are compacted and "dead" objects are cleared to create free space within the heap 128.

As mentioned above, a computing system may be configured to determine whether there are any objects within a given memory region that are being accessed, and, if so, to obtain an estimate of their frequency of access. One conventional scheme to determine if a given memory region is being used is to count the accesses to the memory region over a given time period. Existing schemes simply count total memory accesses within a memory region without regard to whether or not the accesses are to data objects, accesses performed for other purposes, or are multiple read operations to access portions of a single object, and therefore might provide a misleading determination of memory region usage.

Accordingly, in one or more embodiments, the processor 105 is configured to provide a mechanism to count object access to a given region, thereby identifying those regions that contain objects that are being used without inaccuracies resulting from other accesses within the region as well as from multiple read operations to portions of the same object. As such, Java garbage collection and other similar procedures, however, may use the described mechanism to count the accesses to data objects (or simply "objects") within a memory region while ignoring other accesses that may occur, including successive read operations to portions of the same object.

Figure 2:
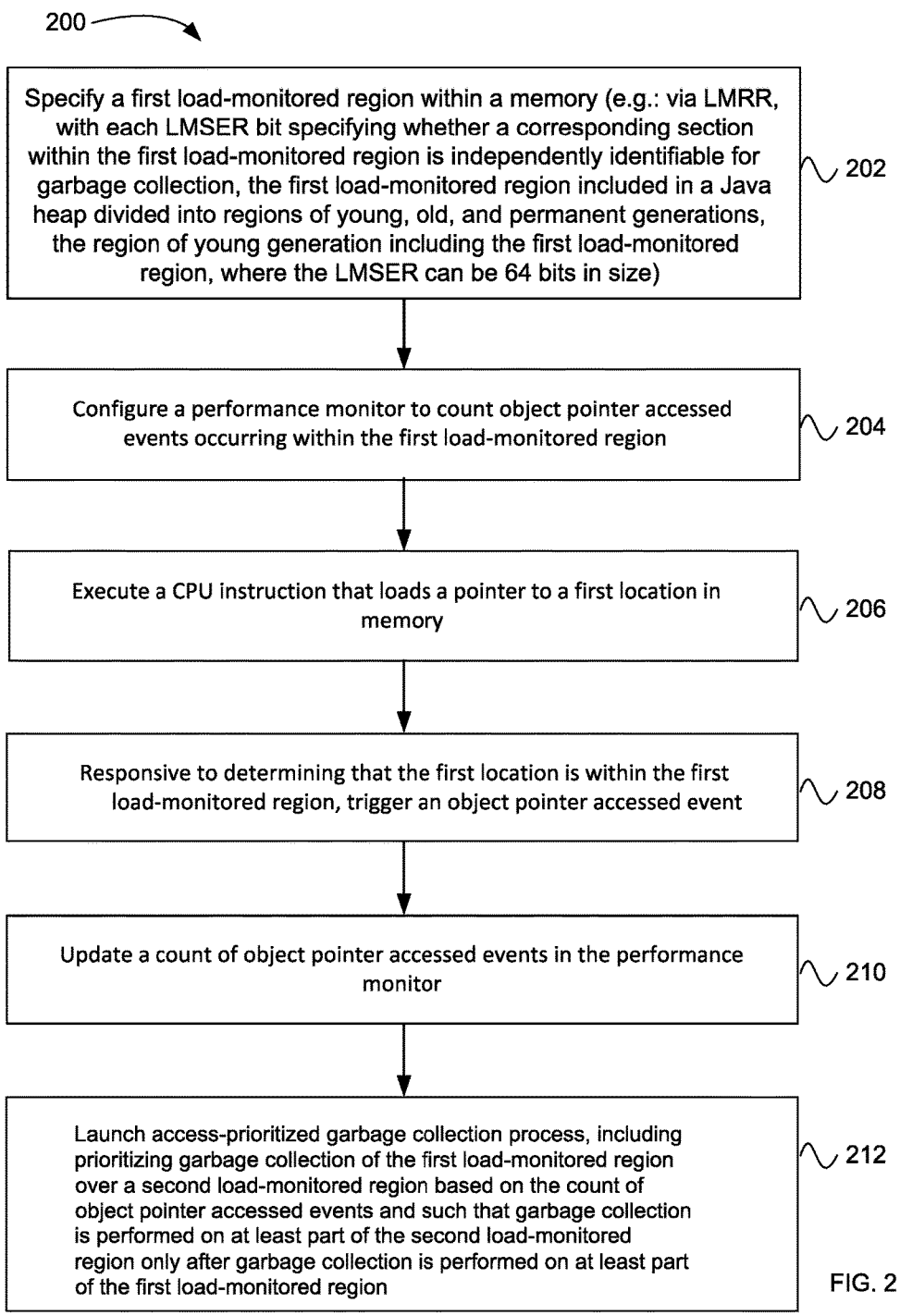
FIG. 2 illustrates a method of managing memory, according to one embodiment disclosed herein.

FIG. 2 illustrates one embodiment of a method 200 for managing memory in a run-time environment, such as the run-time environment 104. The method 200 begins at step 202 by specifying a load-monitored region within a memory. For example, the processor 105 may specify a load-monitored region in the heap 128 by indicating a block of user address spaces in the heap 128 in the load-monitored region register. In one embodiment, the load-monitored region specified by the processor is a subset of the heap 128. In another embodiment, the load-monitored region specified by the processor is the entire heap 128. In another embodiment, the load-monitored region specified by the processor is a generation-based area within the heap. A heap may be divided into regions of young, old, and permanent generations. Permanent generation holds static data. The permanent generation holds static data, such as class description, and has its own form of memory management. New objects are allocated into an "eden" space of young generation. For example, the load-monitored region specified by the processor may be the young generation.

At step 204, a performance monitor, such as performance monitor 114, is configured to count object pointer accessed events occurring within the load-monitored region specified in step 202. Object pointer accessed events are defined to occur whenever the ldmx instruction 126 loads a pointer that points into the load-monitored region specified by the load-monitored region register in step 202. The performance monitor 114 may be configured to count the object pointer accessed events by configuring the performance monitor counter 118.

At step 206, the processor executes a CPU instruction to load a pointer to a first region in the memory. The CPU instruction may be part of the program code for the runtime environment 104. For example, the ldmx instruction 126 may load the pointer into a region that is in the load-monitored region specified in the heap 128. In another example, the ldmx instruction 126 may load the pointer into a region that is not within the load-monitored region specified in the heap 128. At step 208, responsive to determining that the first region is within the load monitored region, the processor 105 triggers an object pointer accessed event. For example, if the first region is within the load-monitored region specified in step 202, the ldmx instruction 126 therefore loads a pointer that points into the load-monitored region. Thus, by the above definition, an object pointer accessed event occurred. If however, the first region is not within the load-monitored region specified in step 202, the ldmx instruction therefore did not load a pointer that points into the load-monitored region. Thus, an object pointer accessed event does not get triggered.

At step 210, if an object pointer accessed event occurred, the performance monitor counter updates the count of object pointer accessed events in the performance monitor. For example, when the ldmx instruction 126 loads a pointer into the first region that is within the load-monitored region, the performance monitor counter 118 registers that an object pointer accessed event occurs. The performance monitor counter 118 updates the count of object pointer accessed events that occurred in the load-monitored region specified in step 202.

Steps 202-210 may be repeated during execution of runtime environment code. At step 212, at some subsequent time, the processor launches a garbage collection process on the load-monitored region based on the count of object pointer accessed events. For example, garbage collection may be performed on those load-monitored region regions having the greater count of object pointer accessed events.

Figure 3:
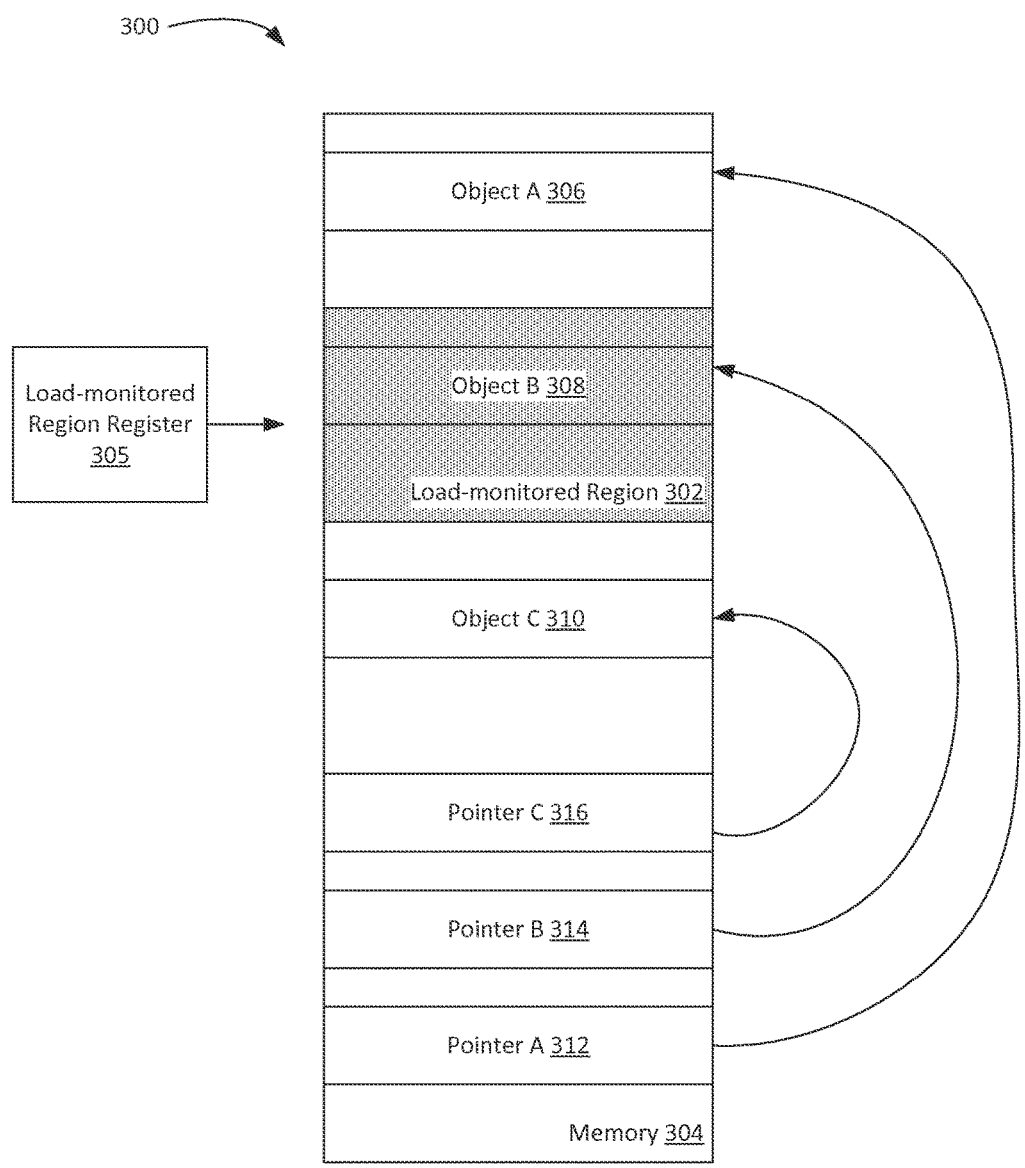
FIG. 3 illustrates an example diagram of enabling a load-monitored region with a load-monitored region register, according to one embodiment disclosed herein.

FIG. 3 illustrates an example of a diagram 300 of enabling a load-monitored region according to one embodiment. The processor specifies a load-monitored region 302 is specified in a memory 304 in a load-monitored region register 305. The memory 304 includes object A 306, object B 308, and object C 310 and pointer A 312, pointer B 314, and pointer C 316. The ldmx instruction 126 loads a pointer that points into a first region. For example, ldmx instruction 126 loads pointer A 312 that points to object A 306. The ldmx instruction that loads pointer A 312 that points to object A 306 does not trigger an object pointer accessed event because object A 306 is not within the load-monitored region 302. The ldmx instruction 126 may load a pointer that points into a second region. The ldmx instruction 126 loads pointer C 316 that points to object C 310. The ldmx instruction 126 that loads pointer C 316 that points to object C 310 does not trigger an object pointer accessed event because object C 310 is not within the load-monitored region. The ldmx instruction 126 may load a pointer that points into a second region. The ldmx instruction 126 loads pointer B 314 that points to object B 308. The ldmx instruction 126 that loads pointer B 314 that points to object B 308 does trigger an object pointer accessed event because object B 308 is in the load-monitored region 302.

Figure 4:
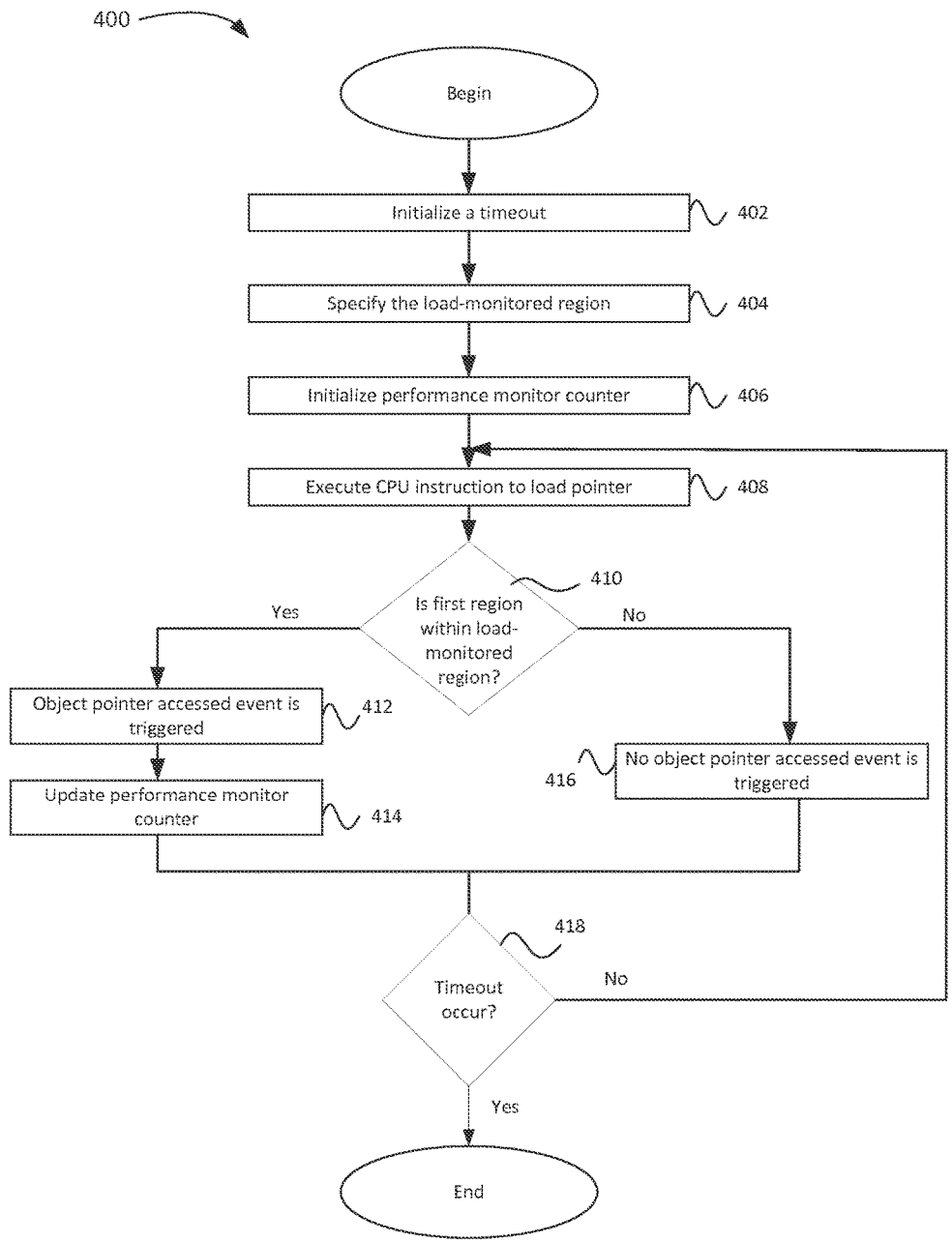
FIG. 4 illustrates a block diagram of a method for managing memory, according to one embodiment disclosed herein.

FIG. 4 illustrates a block diagram of a method 400 for managing memory in a run-time environment, such as run-time environment 104. The method begins at step 402 by initializing a timeout. At step 404, a processor specifies a load-monitored region within a heap. At step 406, the processor initializes a performance monitor counter in the performance monitor counter to count object pointer accessed events occurring within the load-monitored region specified at step 402. At step 408, the processor executes a CPU instruction to load a pointer to a first region in the memory. At decision block 410, the CPU instruction triggered an object pointer accessed event at step 412 because the first region is within the load-monitored region specified in step 404. Because an object pointer accessed event was triggered at step 412, at step 414 the performance monitor counter updates the count in the performance monitor. Referring back to decision block 410 the ldmx instruction does not trigger an object pointer accessed event at step 416 because the first region is not within the load-monitored region specified in step 404. At decision block 418, the timeout is triggered and the performance monitor counter is read. The value read from the performance monitor counter indicates the rate of access in the load-monitored region. If however, the timeout initialized at 402 did not occur, then the method 400 reverts to step 408, and the method 400 repeats until the timeout occurs.

The above method 400 is repeated with the load-monitored region designating other regions within the heap in order to identify those regions containing the highest rates of object accesses. This enables the garbage collection process to prioritize the consolidation of those regions of memory that contain the most-frequently used objects, thereby optimizing performance.

Data Object Usage in a Memory Region for Caching

Figure 5:
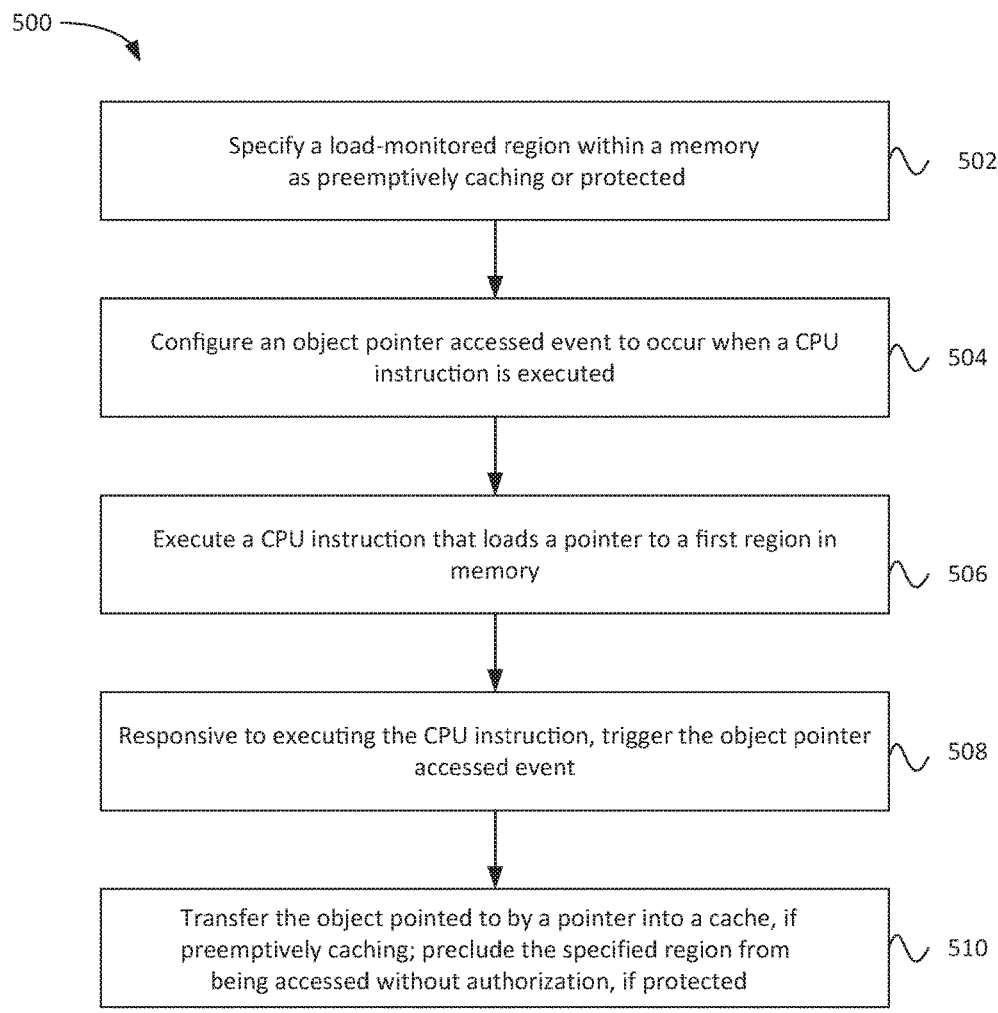
FIG. 5 illustrates another method for managing memory, according to one embodiment disclosed herein.

Another application of this disclosure is to improve caching efficiency. In this embodiment, neither the performance monitor nor the load-monitored region is required. An object pointer accessed event is simply defined to occur when the ldmx instruction executes. FIG. 5 illustrates one embodiment of a method 500 for managing memory in a run-time environment, such as run-time environment 104. The method 500 begins at step 502 by optionally specifying a load-monitored region within a memory. For example, the load-monitored region register 108 may specify a load-monitored region in the heap 128 by indicating a block of user address spaces in the heap 128. In one embodiment, the load-monitored region may be a subset of the heap 128. In another embodiment, the load-monitored region may be specified to be the entire heap 128. Optionally specifying a load-monitored region within a memory narrows the region in which caching occurs. Alternatively, a load-monitored region within a memory need not be specified, and the entire heap 128 is utilized.

At step 504, an object pointer accessed event is configured to occur when a CPU instruction is executed. For example, an object pointer accessed event may be defined to occur whenever the ldmx instruction 126 loads a pointer that points into the load-monitored region specified by the load-monitored region register 108.

At step 506, the CPU instruction that loads a pointer to a first region in memory is executed. For example, ldmx instruction 126 may be executed such that the first region of memory is in the load-monitored region specified by the load-monitored region register in step 502 is loaded. At step 508, responsive to executing a CPU instruction, an object pointer accessed event is triggered.

At step 510, the object pointed to by the pointer is transferred into a cache. For example, the object may be transferred to the high-level cache. Because software typically accesses the object pointer prior to accessing the object itself, bringing the object into a high-level cache when the pointer to the object is accessed significantly increases performance.

In one embodiment, the load-monitored region may be regarded as the entire user memory space so that accessing a pointer to any object would cause that object to be cached. Specifying the load-monitored region as the entire user memory space would eliminate the need to implement the load-monitored region register because there would be no need to specify locations of the load-monitored region.

Alternatively, the load-monitored region register 108 may be used to specify that the load-monitored region is a region of memory containing "critical objects" that need high-performance accessibility. If this is done, then object pointer accessed events may only occur when pointers to objects in the load-monitored region are accessed, causing the objects within it to be cached while less "critical" objects outside the load-monitored region are not cached.

Additionally, other actions in addition to or instead of caching could be taken. For example, if there is a region of memory that is protected, then accessing a pointer into that region could be used as an advance warning that the protected area was about to be accessed. In this case, the object pointer accessed event might be configured to cause an event-based branch, where corrective action could be taken before the actual access to the object occurred. An event based branch is defined as a lightweight interrupt that is handled by the application without supervisor involvement.

Example One

In one example ("example one"), a method for managing memory is provided. The method includes optionally specifying a load-monitored region within a memory, configuring an object pointer accessed event to occur when a CPU instruction is executed, wherein the CPU instruction is configured to load a pointer that points to a region in memory, executing a CPU instruction that loads a pointer to a first region of memory, responsive to executing the CPU instruction, triggering an object pointer accessed event, and transferring the object pointed to by a pointer loaded by the CPU instruction into a cache.

In one embodiment, a load-monitored region may be specified to narrow the region of memory where caching occurs. In one embodiment, the method of example one further comprises loading the specified load-monitored region into a load-monitored region register that is initialized to designate the region of memory currently being evaluated.

In one embodiment, the method of example one further comprises loading a section of the specified load-monitored region into a load-monitored section enable register that enables a desired section of the region of memory. In one embodiment, according to the method of example one, the memory is a Java heap. In one embodiment, according to the method of example one, the objects within the load-monitored region are cached while objects outside the load-monitored region are not cached. In one embodiment, according to the method of example one, the object pointer accessed event is configured to cause an event based branch. In one embodiment, according to the method of example one, the object pointer accessed event is configured to cause an event based branch, and the event based branch is caused to take corrective action before access to an object pointed to by the pointer occurs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., performance monitor) or related data available in the cloud. For example, the performance monitor could execute on a computing system in the cloud and count the object pointer accessed event and store the data in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage memory using access-prioritized garbage collection based on evaluating monitored-load instructions to the exclusion of unmonitored-load instructions, the computer-implemented method comprising:
    designating a first region and a second region within a memory as load-monitored regions;
    configuring a performance monitor to count object pointer accessed events of the first and second load-monitored regions, respectively;
    executing an unmonitored-load instruction to load data from the memory;
    executing a monitored-load instruction by one or more computer processors to load a pointer that points to a first location in the memory;
    responsive to determining that the first location is within at least one of the first and second load-monitored regions, triggering an object pointer accessed event, wherein no object pointer access event is triggered: (i) as a result of any unmonitored-load instruction; and (ii) as a result of any monitored-load instruction that loads a pointer not pointing to any location within the first and second load-monitored regions;
    responsive to triggering the object pointer accessed event, updating, in the performance monitor, at least one of: (i) a first count of object pointer accessed events in the first load-monitored region and (ii) a second count of object pointer accessed events in the second load-monitored region; and
    performing access-prioritized garbage collection including, upon determining that the first count exceeds the second count, prioritizing garbage collection of the first load-monitored region over the second load-monitored region such that garbage collection is performed on at least part of the second load-monitored region only after garbage collection is performed on at least part of the first load-monitored region.

2. The computer-implemented method of claim 1, further comprising:
    loading an indication of the first region into a load-monitored region register that is initialized to designate an area of memory currently being evaluated.

3. The computer-implemented method of claim 2, comprising:
    loading a section of the first load-monitored region into a load-monitored section enable register that enables a section in the first load-monitored region.

4. The computer-implemented method of claim 1, further comprising:
    initializing the performance monitor to a desired value;
    initializing a timeout to occur after a specified period of time; and
    determining a rate of object access based on the first count of object pointer accessed events after the timeout expires.

5. The computer-implemented method of claim 1, wherein the monitored-load instruction loads the pointer that points to the first location in the memory.

6. The computer-implemented method of claim 1, wherein the first load-monitored region comprises a Java heap.

7. The computer-implemented method of claim 1, wherein the garbage collection performed on each load-monitored region includes defragmentation of the respective load-monitored region, wherein the performance monitor disregards any accesses to the first and second load-monitored regions other than object pointer accessed events.

8. The computer-implemented method of claim 7, wherein the monitored-load instruction comprises a first monitored-load instruction, wherein the pointer comprises a first pointer, wherein the computer-implemented method further comprises:
    prior to performing any access-prioritized garbage collection, executing one or more applications in a runtime environment; and
    executing a second monitored-load instruction to load a second pointer that points to a second location in the memory.

9. The computer-implemented method of claim 8, wherein responsive to determining that the second location is not within the first load-monitored region and not within the second load-monitored region, no object pointer accessed event is triggered, whereafter the first and second counts are not updated;
    wherein the one or more computer processors include a load-monitored region register and a load-monitored section enable register, wherein the first region is designated as a load-monitored region by loading an indication of the first region into the load-monitored region register that is initialized to designate an area of memory currently being evaluated, wherein the computer-implemented method further comprises:
    loading a section of the first load-monitored region into the load-monitored section enable register that enables a section in the first load-monitored region, wherein the load-monitored section enable register comprises a multi-bit field, wherein each bit of the multi-bit field specifies whether a corresponding, distinct section within the load-monitored region designated via the load-monitored region register is independently identifiable for garbage collection.

10. The computer-implemented method of claim 9, wherein at least a third region within the memory is not designated as a load-monitored region, wherein check-load instructions loading a pointer pointing to a location within the third region does not trigger any object pointer accessed event, wherein the computer-implemented method further comprises:
- initializing the performance monitor to a desired value;
- initializing a timeout to occur after a specified period of time; and
- determining a rate of object access based on the first count of object pointer accessed events after the timeout expires.

11. The computer-implemented method of claim 10, wherein each unmonitored-load instruction comprises a respective load-double-word instruction, wherein each monitored-load instruction comprises a respective load-double-word-monitored instruction, wherein each load-monitored region is included in a Java heap, wherein the Java heap is divided into regions of young, old, and permanent generations, respectively, wherein the region of permanent generation stores static data including class description and has its own form of memory management, wherein new objects are allocated into an eden space of the region of young generation, wherein each load-monitored region comprises a respective area within the region of young generation.

12. The computer-implemented method of claim 11, wherein a fourth region of the memory is designated as preemptively caching, the fourth region containing a first object, wherein the computer-implemented method further comprises:
- responsive to triggering an object pointer accessed event for the preemptively caching region, preemptively performing a caching operation to transfer the first object from the memory to a cache in anticipation of the first object being accessed and in order to improve a measure of efficiency with which the first object is subsequently accessed.

13. The computer-implemented method of claim 12, wherein a fifth region of the memory is designated as protected, the fifth region containing a second object, wherein the computer-implemented method further comprises:
- responsive to triggering an object pointer accessed event for the protected region, preemptively performing a corrective action in anticipation of the second object being accessed and in order to preclude the protected region from being accessed without authorization;
- wherein the multi-bit field of the load-monitored section enable register comprises a sixty-four-bit field, wherein the corresponding section referred to by each bit comprises a respective one-sixty-fourth of the load-monitored region;
- wherein no object pointer access event is triggered as a result of any unmonitored-load instruction, wherein no object pointer access event is triggered as a result of any monitored-load instruction that loads a pointer not pointing to any location within the first and second load-monitored regions.

14. The computer-implemented method of claim 1, wherein the monitored-load instruction comprises a first monitored-load instruction, wherein the pointer comprises a first pointer, wherein the computer-implemented method further comprises:
- executing a second monitored-load instruction to load a second pointer that points to a second location in the memory.

15. The computer-implemented method of claim 14, wherein responsive to determining that the second location is not within the first load-monitored region and not within the second load-monitored region, no object pointer accessed event is triggered, whereafter the first and second counts are not updated.

16. The computer-implemented method of claim 1, wherein a third region of the memory is designated as preemptively caching, the third region containing an object, wherein the computer-implemented method further comprises:
- responsive to triggering an object pointer accessed event for the preemptively caching region, preemptively performing a caching operation to transfer the object from the memory to a cache in anticipation of the object being accessed and in order to improve a measure of efficiency with which the object is subsequently accessed.

17. The computer-implemented method of claim 1, wherein a third region of the memory is designated as protected, the third region containing an object, wherein the computer-implemented method further comprises:
- responsive to triggering an object pointer accessed event for the third region, preemptively performing a corrective action in anticipation of the object being accessed and in order to preclude the protected region from being accessed without authorization.

18. The computer-implemented method of claim 1, wherein the first pointer points to a first object at the first location in memory, wherein the computer-implemented method further comprises:
- preemptively performing a caching operation to transfer the first object from the memory to a cache in anticipation of the first object being accessed and in order to improve a measure of efficiency with which the first object is subsequently accessed.

19. The computer-implemented method of claim 1, wherein the second load-monitored region comprises a protected region, wherein the computer-implemented method further comprises:
- preemptively performing a corrective action in anticipation of the second object being accessed and in order to preclude the protected region from being accessed without authorization.

20. The computer-implemented method of claim 1, wherein the monitored-load instruction comprises a load-double-word-monitored instruction.

* * * * *